(12) United States Patent
Zhao et al.

(10) Patent No.: US 8,227,086 B2
(45) Date of Patent: Jul. 24, 2012

(54) POLYMER COMPOSITIONS

(75) Inventors: Ming Zhao, East Longmeadow, MA (US); John Fang, Parsippany, NJ (US)

(73) Assignee: Cytec Surface Specialties, S.A., Brussels (BE)

( * ) Notice: Subject to any disclaimer, the term of this patent is extended or adjusted under 35 U.S.C. 154(b) by 586 days.

(21) Appl. No.: 12/438,863

(22) PCT Filed: Aug. 23, 2007

(86) PCT No.: PCT/EP2007/058770
§ 371 (c)(1),
(2), (4) Date: Feb. 25, 2009

(87) PCT Pub. No.: WO2008/025718
PCT Pub. Date: Mar. 6, 2008

(65) Prior Publication Data
US 2010/0015441 A1    Jan. 21, 2010

Related U.S. Application Data

(60) Provisional application No. 60/840,440, filed on Aug. 28, 2006.

(51) Int. Cl.
*B32B 9/04* (2006.01)

(52) U.S. Cl. .................. 428/447; 524/588; 528/32

(58) Field of Classification Search .......... 428/447; 524/588; 528/32
See application file for complete search history.

(56) References Cited

U.S. PATENT DOCUMENTS

| | | | |
|---|---|---|---|
| 3,166,508 A | 1/1965 | Fields | 252/51.5 |
| 5,523,373 A | 6/1996 | Esselborn et al. | 528/26 |
| 5,840,813 A | 11/1998 | Gornowicz et al. | 525/479 |
| 6,383,502 B1 | 5/2002 | Dunshee et al. | 424/401 |
| 6,391,984 B1 | 5/2002 | Grolitzer et al. | 526/65 |
| 6,667,373 B2 | 12/2003 | Grolitzer et al. | 526/65 |
| 2002/0103288 A1 | 8/2002 | Haubennestel et al. | 524/588 |
| 2004/0054071 A1 | 3/2004 | Gobelt et al. | 524/588 |
| 2004/0126683 A1 | 7/2004 | Jin et al. | 430/58.2 |

FOREIGN PATENT DOCUMENTS

| | | |
|---|---|---|
| EP | 0758102 B1 | 12/1999 |
| WO | WO 96/18122 | 6/1996 |

*Primary Examiner* — Edward Cain
(74) *Attorney, Agent, or Firm* — Wenderoth, Lind & Ponack, L.L.P.

(57) ABSTRACT

Polymers are described that are prepared from di and monofunctional silicone and silane monomers of Formula 1 in which Y represents a direct bond or a oxy group; $R^1$ represents an optionally substituted organo group with at least one double bond which optionally may be an activated unsaturated moiety such as a (meth)acrylate group: for example 1-n-propoxy(acrylate) or ethenyl; and $R^2$ and $R^3$ each separately, and independently within each optional repeat unit, represent an optionally substituted hydrocarbo, hydrocarbo(oxy), hydrosilico and/or hydrosilico(oxy) groups; or example, methyl; or trimethylsiloxy; $R^4$ independently represents an optionally substituted organo group with at least one double bond (such as $R^1$ above) an optionally substituted hydrocarbo, and/or hydrosilico group for example trimethylsilyl or ethenyl; and n is from about 0 to about 2000; preferably from about 1 to about 100, for example n is 1. Such polymer precursors can be used to prepare flow modifying agents, defoamers and/or pressure sensitive adhesives.

(1)

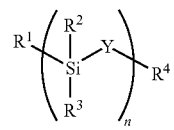

25 Claims, 2 Drawing Sheets

POLYMER COMPOSITIONS

This application is the U.S. National Phase application of International Application No. PCT/EP2007/058770, filed Aug. 23, 2007 and published as WO 2008/025718, which claims benefit of priority to U.S. Provisional Application No. 60/840,440, filed Aug. 28, 2006, each of which is incorporated by reference herein in its entirety.

This invention relates to certain silicon containing polymers that have various uses. Such uses include, but are not limited to, use as additives to reduce the amount of foam produced in a composition to which they are added (defoamers); use as additives to modify the rheology of a composition to which they are added (flow-modifiers); and/or use as pressure sensitive adhesives (PSA). The invention also relates to suitable polymer precursors for making these polymers; processes for making the polymers; use of these polymers in various uses for example as de-foamers, flow modifiers and/or PSA; and suitable formulations containing these polymers and/or their polymer precursors.

Defoamer

Some compositions (for example lubricants) have a tendency to generate significant amounts of undesirable foam during use. This is a tendency which can be aggravated by many of the other additives in a formulation such as those used to improve lubricant performance. Various agents have been developed (such as acrylate polymers) which are widely added in minor effective amounts to suppress foam generation.

However current anti-foaming agents are unsatisfactory and a continuing need exists to inhibit foaming more effectively. Newer lubricant formulations have been developed that can be used over a wider range of conditions. These require a corresponding improvement in anti-foaming performance. It would be desirable to provide an improved anti-foaming agent that suppresses foam over a wide range of conditions when added to suitable formulations (such as hydrocarbon oils). It is one object of the present invention to address this problem.

Therefore one aspect of the present invention provides anti-foaming additives (defoamers) comprising the polymers described below. Another aspect of the invention relates to (co)monomers used to make these defoamers and processes for preparing them. A further aspect of the invention provides the compositions/formulations to which these defoamers are added (defoaming compositions). Preferred de-foaming compositions are lubricants and/or oils such as synthetic and/or hydrocarbon oils.

Flow Modifier

Some compositions (for example coating formulations) may not have the desired rheology; for example, they may not be readily applied to a desired substrate to form a substantial defect free uniform coat thereon. Various agents (flow modifiers) have been developed which can be added to a coating composition to modify rheology and for example improve surface quality of the resultant coating film. Use of appropriate flow modifiers may improve properties such as composition flow and leveling, high gloss (i.e. increased directional reflectance properties such as specular gloss, contrast gloss, DOI [distinctiveness of image] gloss, absence of texture gloss, haze and/or sheen); control the forming of defects (such as crater, fish eye, pin holes, and/or orange peel [dimpled surface irregularity due to failure of liquid coating to level after application]).

However current flow modifiers agents are not completely satisfactory and it would be desirable to provide flow modifiers which exhibit improvements in some of all of the above. It is one object of the present invention to address this problem.

Therefore another aspect of the present invention provides flow modifiers comprising the polymers described below. Another aspect of the invention relates to (co)monomers used to make these flow modifiers and processes for preparing them. A further aspect of the invention provides the compositions/formulations to which these flow modifiers are added (flow modified compositions). Preferred flow modified compositions are coating compositions such as liquid coating resins.

Pressure Sensitive Adhesive

Pressure sensitive adhesives (PSA) form a permanently adhesive film capable of adhering to various surfaces upon slight pressure at ambient temperature. PSA may be formed from aqueous lattices or solutions in other solvents and are used to prepare self-adhesive products, such as labels, tapes or films. PSAs often require energy (in the form of for example heat, UV or e-beam radiation) to cure the adhesive and/or evaporate solvent.

However current PSAs are not completely satisfactory for many high performance applications. It would be desirable to provide PSAs which have improved adhesive properties. Areas for improvement include one or more of the following areas: the capacity for the PSA perform over a broad range of temperatures at both high and low temperatures, low surface tension adhesion, improved chemical resistance, durability and loop tack. It is an object of the present invention to address some or all or these problems.

Therefore yet another aspect of the present invention provides PSA comprising the polymers described below. Another aspect of the invention relates to (co)monomers used to make these PSA and processes for preparing them. A further aspect of the invention provides the compositions/formulations to which these PSA are added (PSA compositions).

PRIOR ART

U.S. Pat. No. 3,166,508 (Monsanto) describes a conventional anti-foaming additive of a mixture of various homo and copolymers comprising $C_{3-7}$alkyl acrylate. The mixture is added to an oil in amount less than 0.1% by weight as this amount is stated to inhibit foam without adversely effecting the oil viscosity. This document does not mention the use of silicone containing monomers.

U.S. Pat. No. 5,840,813 (Dow Corning) describes a process that uses low molecular weight (meth)acrylate siloxane monomers to prepare by mini emulsion high molecular weight homopolymers containing (meth)acryloxy groups as the polymer back bone with organosiloxane side chains. The stated use of these high molecular weight polymers is to formulate cosmetics and inks and lubricants.

U.S. Pat. No. 5,523,373 (=EP 0679675) (Th. Goldschmidt) describes polymethacrylate ester poly siloxane AB block copolymers used as additives for lacquers and vanishes.

US 2002-0103288 (=EP 1193303) (Byk Chemie) describes compositions with anti-adhesion and dirt repelling properties comprising polysiloxane additives which have a siloxane side chain and a back bone which can be formed from many monomers including alkylacrylates. The document indicates that a mono acrylate functional siloxane monomer may be used to introduce the siloxane into the final polymer. Such mono functional monomers have a comb like structure.

US 2004-0054071 (=EP 1375605) (Byk Chemie) describes an AB block copolymer of preferred molecular weight 1 to 100 kilodalton each block being prepared by living free radical polymerisation of siloxane and acrylate monomers. Such polymers are prepared using mono functional silanes which form preferred polymers having a linear or comb structure. They are used as leveling agents.

Aspects of the present invention are described herein and in the claims.

Unless the context clearly indicates otherwise, as used herein plural forms of the terms herein are to be construed as including the singular form and vice versa.

The term "comprising" as used herein will be understood to mean that the list following is non-exhaustive and may or may not include any other additional suitable items, for example one or more further feature(s), component(s), ingredient(s) and/or substituent(s) as appropriate.

Therefore broadly the present invention relates to one or more reactive silicon containing polymer precursor(s) represented by Formula 1:

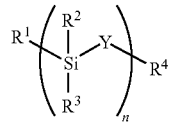

Formula 1 in which
Y represents a direct bond or a oxy group; preferably oxy,
$R^1$ represents an optionally substituted organo group with at least one double bond which optionally may be an activated unsaturated moiety such as a (meth)acrylate group:
for example

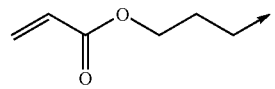

1-n-propoxy(acrylate);

(ethenyl);
$R^2$ and $R^3$ each separately, and independently within each optional repeat unit, represent an optionally substituted hydrocarbo, hydrocarbo(oxy), hydrosilico and/or hydrosilico(oxy) groups;
for example, methyl;

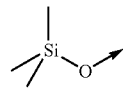

(trimethylsiloxy);
$R^4$ independently represents an optionally substituted organo group with at least one double bond (such as $R^1$ above) an optionally substituted hydrocarbon and/or hydrosilico group
for example

(trimethylsilyl);

(ethenyl);
n is from about 0 to about 2000; preferably from about 1 to about 100,
for example n is 1

Broadly one aspect of the invention provides one or more reactive silicon containing polymer precursor(s) represented by Formula 1a:

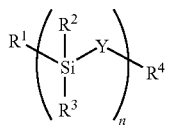

Formula 1a in which
Y represents a direct bond or a oxy group; preferably oxy,
$R^1$ represents an optionally substituted organo group with at least one double bond which optionally may be an activated unsaturated moiety such as a (meth)acrylate group:
for example

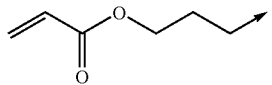

1-n-propoxy(acrylate);

(ethenyl);
$R^2$ and $R^3$ each separately, and independently within each optional repeat unit, represent an optionally substituted hydrocarbo, hydrocarbo(oxy), hydrosilico and/or hydrosilico(oxy) groups;
for example, methyl;

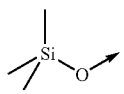

(trimethylsiloxy);
$R^4$ independently represents an optionally substituted organo group with at least one double bond (such as $R^1$ above) an optionally substituted hydrocarbon and/or hydrosilico group
for example

(trimethylsilyl);

(ethenyl);
n is from about 0 to about 2000; preferably from about 1 to about 100,
for example n is 1
with the proviso ("Proviso P") that the polymer precursors are other than composed of a polysiloxane main chain and at least one block of polymerised unsaturated monomers obtained by reacting at least one polysiloxane containing pre-polymer containing at least one transferable group with ethylenically unsaturated monomers in a controlled free radical additional polymerisation.

Another aspect of the invention provides use as a flow modifying agent of or more reactive silicon containing polymer precursor(s) represented by Formula 1a (as described herein) i.e. excluding those of Formula 1 described by Proviso P herein.

A yet other aspect of the invention provides use as a defoamer of one or more reactive silicon containing polymer precursor(s) represented by Formula 1b:

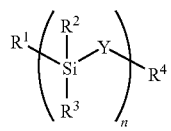

Formula 1b in which

Y represents a direct bond or a oxy group; preferably oxy, $R^1$ represents an optionally substituted organo group with at least one double bond which optionally may be an activated unsaturated moiety such as a (meth)acrylate group:

for example

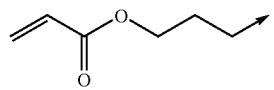

1-n-propoxy(acrylate);

(ethenyl);

$R^2$ and $R^3$ each separately, and independently within each optional repeat unit, represent an optionally substituted hydrocarbo, hydrocarbo(oxy), hydrosilico and/or hydrosilico (oxy) groups;

for example, methyl;

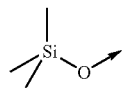

(trimethylsiloxy);

$R^4$ independently represents an optionally substituted organo group with at least one double bond (such as $R^1$ above) an optionally substituted hydrocarbo, and/or hydrosilico group for example

(trimethylsilyl);

(ethenyl);

n is from about 0 to about 2000; preferably from about 1 to about 100, for example n is 1.

A still other aspect of the invention provides the use in the preparation of a pressure sensitive adhesive of one or more reactive silicon containing polymer precursor(s) represented by Formula 1b (as described herein):

For convenience Formula 1a is used herein to denote only those compounds of Formula 1 that are not described by proviso "P" whereas Formula 1b is used herein to denotes all those compounds of Formula 1 including those described by proviso "P". Formulae 2a, 2b etc are used similarly.

Most conveniently compounds of Formula 1 (i.e. Formula 1a and/or 1b) may comprise:

a) compounds of Formula 2

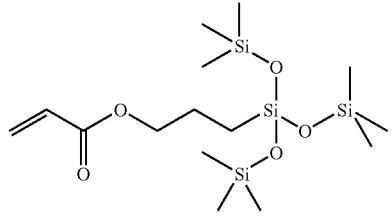

Formula 2 which are those of Formula 1 in which
Y is —O—, n is 1
$R^1$ is

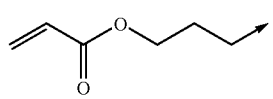

(1-n-propoxy(acrylate));
$R^2$ and $R^3$ are both

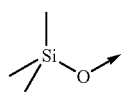

(trimethylsiloxy); and
$R^4$ is

;

or
b) compounds of Formula 3

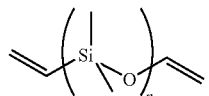

Formula 3 which are those of Formula 1 in which
Y is —O—,
$R^1$ and $R^4$ are both

(ethenyl), and
$R^2$ and $R^3$ are both methyl

Conveniently the polymer precursors of the invention represented by Formula 1 comprise difunctional silanes and/or mono or multi functional silicones.

Preferably the polymer precursors of Formula 1 are suitable for preparing one or more of: an anti-foaming polymeric additive (defoamer); an additive that modifies the rheology of a composition to which it is added (flow-modifiers); and/or a pressure sensitive adhesive.

Preferably in Formula 1, $R^1$ is hydrogen or a hydrocarbyl group;

$R^2$ and $R^3$ each separately, and independently within each optional repeat unit, represent an optionally substituted hydrocarbo group and/or optionally substituted hydrocarbosilyloxy;

n is from about 0 to about 2000; preferably from about 1 to about 100

A further aspect of the invention provides a method of using one or more compounds of Formula 1b to prepare one or more anti-foaming polymeric additives (defoamer);

A further aspect of the invention provides a method of using one or more compounds of Formula 1b to prepare one or more pressure sensitive adhesives.

A further aspect of the invention provides a method of using one or more compounds of Formula 1a to prepare one or more additives that modify the rheology of a composition to which it is added (flow-modifier).

Conveniently the polymer precursors represented by Formula 1 comprise mono functional silanes, difunctional silanes and/or mono or multi functional silicones.

Preferred monofunctional silicone polymer precursors of Formula 1a are those where:

Y is oxy $R^1$ is H or $C_{1-10}$hydrocarbyl group, more preferably H or $C_{1-4}$alkyl.

$X^1$ is H, vinyl, (meth)acryloxy, amino, hydroxyl, epoxy and/or carboxyl $R^2$ and $R^3$ independently represent alkyl, alkoxy, —CH=CH$_2$, phenyl, alkyl, alkyl or alkoxy group, any of the aforegoing optionally substituted by one or more halo, amine, hydroxyl and/or carboxyl group(s): more preferably independently selected from $C_{1-4}$alkyl optionally substituted by fluoro, amino, hydroxyl and/or carboxyl group(s), $C_{1-4}$alkoxy optionally substituted by amino, hydroxyl and/or carboxyl group(s, —CH=CH$_2$, phenyl, and $R^4$ is optionally substituted alkyl or alkoxy (more preferably substituted $C_{1-4}$alkyl and/or $C_{1-4}$alkoxy); where the optional substituent is selected from H, vinyl, (meth)acryloxy, amino, hydroxyl, epoxy and/or carboxyl Preferred difunctional silicone polymer precursors of Formula 1b are those where:

$R^1$ and $R^4$ independently represent optionally substituted alkyl or alkoxy, (more preferably optionally substituted $C_{1-4}$alkyl and/or $C_{1-4}$alkoxyl); where the optional substituent is selected from H, vinyl, (meth)acryloxy, amino, hydroxyl, epoxy and/or carboxyl and $R^2$ and $R^3$ independently represent alkyl, alkoxy, —CH=CH$_2$ and/or phenyl, any of the aforegoing optionally substituted by one or more alkyl, halo, amine, hydroxyl and/or carboxyl group(s): more preferably independently selected from $C_{1-4}$alkyl optionally substituted by fluoro, amino, hydroxyl and/or carboxyl group(s), $C_{1-4}$alkoxy optionally substituted by amino, hydroxyl and/or carboxyl group(s), —CH=CH$_2$, and/or phenyl.

Yet another convenient aspect of the present invention provides polymer precursors of Formula 1 where Y is a direct bond (i.e. silanes). Preferred silane polymer precursors of Formula 1 are those where:

$R^1$ represents optionally substituted —CH=CH$_2$ (more preferably —CH=CH$_2$ or —CMe=CH$_2$), where the optionally substituent (which may be divalent and thus form a link with the silane moiety) is $C_{1-4}$alkyl or $C_{1-4}$alkoxy alkoxy; and $R^2$, $R^3$ and $R^4$ independently represent alkyl, alkoxy, —CH=CH$_2$ and/or phenyl, any of the aforegoing optionally substituted by one or more alkyl, halo, amine, hydroxyl and/or carboxyl group(s): more preferably independently selected from $C_{1-4}$alkyl optionally substituted by fluoro, amino, hydroxyl and/or carboxyl group(s), $C_{1-4}$alkoxy optionally substituted by amino, hydroxyl and/or carboxyl group(s), —CH=CH$_2$, and/or phenyl.

In Formulae 1, 1a and 1b, preferably n is from about 5 to about 500, more preferably from about 10 to about 200. If the Formulae 1 herein represent a polydisperse mixture then n is a average over the mixture, if Formulae 1 represent a monodisperse compound then n is an integer.

Preferably the polymer precursors of the invention have a molecular weight of from about 200 to about 6000 daltons, more preferably 500 to about 4000 daltons, most preferably from about 800 to about 2000 daltons.

Advantageously the monomers of Formula 1 may comprise vinyl terminated siloxane, allyl mono trimethylsiloxy terminated polyethylene oxide, methacryloxy mono trimethylsiloxy terminated polyethylene oxide, monocarbinol terminated polydimethylsiloxane, dicarbinol terminated polydimethylsiloxane, 2 or 3-epoxy propylether terminated polydimethylsiloxane.

Useful silicone monomers of the invention comprise those of formula:

i.e. in those of Formula 1 where

Y is —O—

$R^1$ is —OSi(Me)$_2$Y$^1$ where $Y^1$ is hydrogen or alkyl, for example methyl or $X^1$ (as described below); and $R^2$ and $R^3$ are both methyl;

$R^4$ is $X^1R^5Si(Me)_2$- where $X^1$ is hydrogen, vinyl, acryloxy, methacryloxy, amino, hydroxyl, epoxy or carboxyl for example acryloxy; and $R^5$ is alkylene or alkoxylene.

More useful silicone monomers are those tertiary silicones such as:

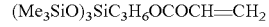

i.e. in those of Formula 1 where

Y is —O— n is 1

$R^1$ is Me$_3$Si—

$R^2$ and $R^3$ are each Me$_3$SiO—

$R^4$ is —C$_3$H$_6$OCOCH=CH$_2$

Conveniently $R^2$ and $R^3$ are independently the same as they each re-occur in each repeat unit and/or conveniently $R^2$ and $R^3$ are identical within each repeat unit and one or more repeat units may be different. More conveniently $R^2$ and $R^3$ are the same throughout Formula 1.

The terms 'functional group'; optional substituent' and/or 'optionally substituted' as used herein (unless followed by a list of other substituents) signifies one or more of following groups (or substitution by these groups): carboxyl, sulpho, formyl, hydroxyl, amino, imino, nitrilo, mercapto, cyano, nitro, methyl, methoxy, phospho and/or combinations thereof. These optional groups include all chemically possible combinations in the same moiety of a plurality (preferably two) of the aforementioned groups (e.g. amino and sulphonyl if directly attached to each other represent a sulphamoyl group). Preferred optional substituents comprise: carboxyl, sulpho, hydroxyl, amino, mercapto, cyano, methyl, halo, trihalomethyl and/or methoxy.

The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms.

Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen, silicon and/or sulphur, more preferably from hydrogen, nitrogen, oxygen, phosphorus and/or sulphur. Convenient phosphorus containing groups may comprise: phosphinyl (i.e. a '—$PR_3$' radical where R independently denotes H or hydrocarbyl); phosphinic acid group(s) (i.e. a '—$P(=O)(OH)_2$' radical); and phosphonic acid group(s) (i.e. a '—$P(=O)(OH)_3$' radical).

Most preferred organic groups comprise one or more of the following carbon containing moieties: alkyl, alkoxy, alkanoyl, carboxyl, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term 'hydrocarbo group' as used herein is a sub-set of a organic group and denotes any univalent or multivalent moiety (optionally attached to one or more other moieties) which consists of one or more hydrogen atoms and one or more carbon atoms and may comprise one or more saturated, unsaturated and/or aromatic moieties. Hydrocarbo groups may comprise one or more of the following groups. Hydrocarbyl groups comprise univalent groups formed by removing a hydrogen atom from a hydrocarbon (for example alkyl). Hydrocarbylene groups comprise divalent groups formed by removing two hydrogen atoms from a hydrocarbon, the free valencies of which are not engaged in a double bond (for example alkylene). Hydrocarbylidene groups comprise divalent groups (which may be represented by "$R_2C=$") formed by removing two hydrogen atoms from the same carbon atom of a hydrocarbon, the free valencies of which are engaged in a double bond (for example alkylidene). Hydrocarbylidyne groups comprise trivalent groups (which may be represented by "$RC\equiv$"), formed by removing three hydrogen atoms from the same carbon atom of a hydrocarbon the free valencies of which are engaged in a triple bond (for example alkylidyne). Hydrocarbo groups may also comprise saturated carbon to carbon single bonds (e.g. in alkyl groups); unsaturated double and/or triple carbon to carbon bonds (e.g. in respectively alkenyl and alkynyl groups); aromatic groups (e.g. in aryl groups) and/or combinations thereof within the same moiety and where indicated may be substituted with other functional groups.

Similar to the term organo above the term silico used herein denotes any univalent or multivalent moiety (optionally attached to one or more other moieties) comprises one or more (preferably one) silicon atoms combined with one or more organo moieties and/or hydrogen atoms. The term silyl denotes an univalent silico moiety (analogous to hydrocarbyl) and silylene a dilavent silico moiety (analogous to hydrocarbylene) comprising a silicon atom combined with one or more organo moieties and/or hydrogen atoms.

The term 'alkyl' or its equivalent (e.g. 'alk') as used herein may be readily replaced, where appropriate and unless the context clearly indicates otherwise, by terms encompassing any other hydrocarbo group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbo species linking two or more moieties (such as bivalent hydrocarbylene radicals e.g. alkylene).

Any radical group or moiety mentioned herein (e.g. as a substituent) may be a multivalent or a monovalent radical unless otherwise stated or the context clearly indicates otherwise (e.g. a bivalent hydrocarbylene moiety linking two other moieties). However where indicated herein such monovalent or multivalent groups may still also comprise optional substituents. A group which comprises a chain of three or more atoms signifies a group in which the chain wholly or in part may be linear, branched and/or form a ring (including spiro and/or fused rings). The total number of certain atoms is specified for certain substituents for example $C_{1-N}$organo, signifies a organo moiety comprising from 1 to N carbon atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective.

Preferably any of the organo groups listed herein comprise from 1 to 36 carbon atoms, more preferably from 1 to 18. It is particularly preferred that the number of carbon atoms in an organo group is from 1 to 12, especially from 1 to 10 inclusive, for example from 1 to 4 carbon atoms.

As used herein chemical terms (other than IUAPC names for specifically identified compounds) which comprise features which are given in parentheses—such as (alkyl)acrylate, (meth)acrylate and/or (co)polymer—denote that that part in parentheses is optional as the context dictates, so for example the term (meth)acrylate denotes both methacrylate and acrylate.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cryptands/cryptates, inclusion compounds, intercalation compounds, interstitial compounds, ligand complexes, organometallic complexes, non-stoichiometric complexes, π-adducts, solvates and/or hydrates); isotopically substituted forms, polymeric configurations [such as homo or copolymers, random, graft and/or block polymers, linear and/or branched polymers (e.g. star and/or side branched), cross-linked and/or networked polymers, polymers obtainable from di and/or tri-valent repeat units, dendrimers, polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective as defined herein.

Polymers

In a further aspect of the present invention there is provided a polymer obtained and/or obtainable from one or more of the mono silicon functional polymer precursor(s) of the present invention (e.g. as represented by Formula 1 and described herein).

Preferably the polymeric anti-foaming agent of the present invention comprises a co-polymer obtained and/or obtainable from one or more of the mono silicon functional polymer precursor(s) of the present invention and one or more non silicon polymer precursor(s).

Preferably the non silicon functional polymer precursor comprising one or more activated unsaturated moiet(ies), more preferably one or more vinyl-functionalized polymer precursor(s), for example one or more (meth)acrylate(s). These are described more fully below.

Silicone modified polymers of the invention may include homo-polymers, co-polymers, ter-polymers, tetra-polymers and penta- or multi-monomer compositions blends and/or mixtures of the non silicone and monofunctional silicone polymer precursor(s).

Conveniently the silicone modified polymers of the present invention may comprises polymers formed from vinyl-functionalized mono-terminal silicone monomers such as monomethacryloxypropyl terminated polydimethylsiloxane and mono vinyl terminated polydimethylsiloxane with any of the non silicone monomers described herein.

The reactive silicone comprising the polymer of the invention is preferably present in amount from a trace amount to 100% by weight. More preferably polymers of the invention comprise from about 0.1% to about 50%, most preferably from about 0.1% to about 20%, for example from about 1% to about 10% by weight of polymer obtained from mono functional reactive silane and/or silicone monomers such as (meth)acrylated macro silicones. Conveniently the polymer that is not obtained from the reactive silicone monomers is obtained substantially entirely from vinyl-functionalized polymer precursor(s), for example one or more (meth)acrylate(s).

As used herein molecular weight can be denoted in units of dalton (Da) or kilodaltons (kDa). Units of kg/mol may also be used herein to denote a weight-average molar mass (where 1 kDa is equivalent to 1 kg/mol). Unless indicated to the contrary all molecular weights or molar masses used herein are measured or calculated as a weight average ($M_w$).

Preferably the molecular weight of polymers of the invention is from about 5 kilodaltons (kDa) to several million Dalton, more preferably from about 20 kDa to about 500 kDa, most preferably up to about 150 kDa, for example up to about 100 kDa.

Preferably polymer precursors of Formula 1 contain at least about 0.1% Si and preferably from about 0.1% to about 10% weight percent silicon.

The amount of siliconated acrylate monomer in the acrylate copolymer is adequate to provide the aforementioned positive amount up to about 60 weight % silicon in the acrylate copolymer.

Preferred amounts of siliconated acrylate monomer that can be used to achieve the desired concentration in the copolymer is from about 0.001 to about 20 weight %, more preferably about 0.01 to about 10 weight %, most preferably about 0.1 to about 5 weight %.

The molecular weight (weight average Mw) of the acrylate copolymer defoaming agent can vary within broad limits and is generally from about 10 kDa to about 500 kDa, preferably from about 20 to about 250 kDa, more preferably from about 20 to about 250 kDa. The applicant has found that at molecular weight above about 250 kDa (especially above 500 kDa) the acrylate copolymer tends to settle out in many hydrocarbon oils and lose defoaming effectiveness which relies on being finely dispersed in the oil. When the molecular weight is lower than about 10,000 daltons generally the polymer tends to dissolve in and form the same phase as the oil and when this happens the polymer cannot act as a defoamer.

The molecular weight (weight average Mw) of the acrylate polymer flow modifier may vary within broad limits, but preferably is from about 1,000 Da to about 50,000 Da, more preferably from about 3,000 Da to about 30,000 Da.

The molecular weight (weight average Mw) the acrylate polymer for pressure sensitive adhesive may be from about 1,000 Da to about 5 million Da, preferably from about 5,000 Da to about 800,000 Da.

The silicon containing acrylate copolymer antifoaming agents of the invention are effective at very low concentrations, i.e. less than about 2000 parts per million parts of hydrocarbon oil, preferably less than 1500 ppm. From 20 to 500 parts of the copolymer is preferred, but this may be varied depending upon the nature of the oil, amounts less than 200 ppm by weight usually being sufficient.

The polymers of this invention may form polymeric particles and/or films and can be made by any suitable method such as describe herein.

The polymer of this invention can have a $T_g$ in the range of −75° C. to 250° C. depending on the desired application.

The silicone modified polymers of the invention may also be blended with other suitable formulating components known to those skilled in the art. These may comprise: UV photo initiator(s), UV stabilizer(s), anti-oxidant(s), radical scavenger(s), thickener(s); other defoamer(s); plasticizer(s), solvent(s), tackifier(s), crosslinker(s), and catalyst(s). To improve defoaming performances components are preferred which enhance high temperature performance, durability, length of useful life and/or cost efficiency.

Polymers of the present invention may be prepared by one or more other suitable polymer precursor(s) which may be organic and/or inorganic and comprise any suitable (co) monomer(s), (co)polymer(s) [including homopolymer(s)] and mixtures thereof which comprise moieties which are capable of forming a bond with the or each polymer precursor(s) to provide chain extension and/or cross-linking with another of the or each polymer precursor(s) via direct bond(s) as indicated herein.

Polymer precursors of the invention may comprise one or more monomer(s), oligomer(s), polymer(s); mixtures thereof and/or combinations thereof which have suitable polymerisable functionality.

A monomer is a substantially monodisperse compound of a low molecular weight (for example less than one thousand daltons) which is capable of being polymerised.

A polymer is a polydisperse mixture of macromolecules of large molecular weight (for example many thousands of daltons) prepared by a polymerisation method, where the macromolecules comprises the multiple repetition of smaller units (which may themselves be monomers, oligomers and/or polymers) and where (unless properties are critically dependent on fine details of the molecular structure) the addition or removal one or a few of the units has a negligible effect on the properties of the macromolecule.

A oligomer is a polydisperse mixture of molecules having an intermediate molecular weight between a monomer and polymer, the molecules comprising a small plurality of monomer units the removal of one or a few of which would significantly vary the properties of the molecule.

Depending on the context the term polymer may or may not encompass oligomer.

The polymer precursor of and/or used in the invention may be prepared by direct synthesis or (if the polymeric precursor is itself polymeric) by polymerisation. If a polymerisable polymer is itself used as a polymer precursor of and/or used in the invention it is preferred that such a polymer precursor has a low polydispersity, more preferably is substantially monodisperse, to minimise the side reactions, number of by-products and/or polydispersity in any polymeric material formed from this polymer precursor. The polymer precursor(s) may be substantially un-reactive at normal temperatures and pressures.

Except where indicated herein polymers and/or polymeric polymer precursors of and/or used in the invention can be (co)polymerised by any suitable means of polymerisation well known to those skilled in the art. Examples of suitable methods comprise: thermal initiation; chemical initiation by adding suitable agents; catalysis; and/or initiation using an optional initiator followed by irradiation, for example with electromagnetic radiation (photo-chemical initiation) at a suitable wavelength such as UV; and/or with other types of radiation such as electron beams, alpha particles, neutrons and/or other particles.

The substituents on the repeating unit of a polymer and/or oligomer may be selected to improve the compatibility of the materials with the polymers and/or resins in which they may be formulated and/or incorporated for the uses described herein. Thus the size and length of the substituents may be selected to optimise the physical entanglement or interlocation with the resin or they may or may not comprise other reactive entities capable of chemically reacting and/or cross-linking with such other resins as appropriate.

Non Silicone Co-Monomers

The selection of preferred non-silicone co-monomers for use to prepare copolymers of the present invention will generally be made depending on application performance criteria, such as desired $T_g$, polarity, dispersability, solubility, performance properties such as substrate wetting, peel and sheer strength, tack and loop, chemical resistance, compatibility, toughness and/or flexibility. The desired properties will depend on the end use of the polymer to be prepared. Preferred non silicon containing polymer precursors are those that comprise an activated unsaturated moiety.

Throughout this specification, the term "activated unsaturated moiety" "is used to denote an species comprising at least one unsaturated carbon to carbon double bond in chemical proximity to at least one activating moiety. Preferably the activating moiety comprises any group which activates an ethylenically unsaturated double bond for addition thereon by a suitable electrophilic group. Conveniently the activating moiety comprises oxy, thio, (optionally organo substituted) amino, thiocarbonyl and/or carbonyl groups (the latter two groups optionally substituted by thio, oxy or (optionally organo substituted)amino). More convenient activating moieties are (thio)ether, (thio)ester and/or (thio)amide moiet(ies). Most convenient "activated unsaturated moieties" comprise an "unsaturated ester moiety" which denotes an organo species comprising one or more "hydrocarbylidenyl(thio)carbonyl(thio)oxy" and/or one or more "hydrocarbylidenyl(thio)carbonyl(organo)amino" groups and/or analogous and/or derived moieties for example moieties comprising (meth)acrylate functionalities and/or derivatives thereof. "Unsaturated ester moieties" may optionally comprise optionally substituted generic α,β-unsaturated acids, esters and/or other derivatives thereof including thio derivatives and analogs thereof.

Advantageous activated unsaturated moieties are those represented by Formula Z:

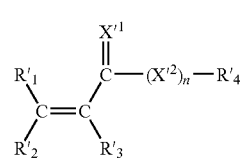

Formula Z' where n' is 0 or 1, $X'^1$ is oxy or, thio $X'^2$ is oxy, thio or $NR'_5$ (where $R'_5$ represents H or optionally substituted organo), $R'_1$, $R'_2$, $R'_3$ and $R'_4$ each independently represent H, optionally substituents and/or optionally substituted organo groups; and all suitable isomers thereof, combinations thereof on the same species and/or mixtures thereof.

In will be appreciated that the terms "activated unsaturated moiety"; "unsaturated ester moiety" and/or Formula Z herein may represent a discrete chemical species (such as a compound, ion, free radical, oligomer and/or polymer) and/or any part(s) thereof. Thus Formula Z may also represent multivalent (preferably divalent) radicals. Thus the options given herein for n', $X'^1$, $X'^2$, $R'_1$, $R'_2$, $R'_3$, $R'_4$ and $R'_5$, also encompass corresponding bi or multivalent radicals as appropriate.

More advantageous moieties of Formula Z (including isomers and mixtures thereof) are those where n' is 1; $X'^1$ is O; $X'^2$ is O, S or $NR'_5$;

$R'_1$, $R'_2$, $R'_3$, and $R'_4$ are independently selected from: H, optional substituents and optionally substituted $C_{1-10}$hydrocarbo, and where present $R'_5$ is selected from H and optionally substituted $C_{1-10}$hydrocarbo.

Most advantageously n' is 1, $X'^1$ is O; $X'^2$ is O or S and $R'_1$, $R'_2$, $R'_3$ and $R'_4$ are independently H, hydroxy and/or optionally substituted $C_{1-6}$hydrocarbyl.

Specifically n' may be 1, $X'^1$ and $X'^2$ may be both O; and $R'_1$, $R'_2$, $R'_3$ and $R'_4$ may be independently H, OH, and/or $C_{1-4}$alkyl.

For moieties of Formula Z where n' is 1 and $X'^1$ and $X'^2$ are both O then:

when one of ($R'_1$ and $R'_2$) is H and also $R'_3$ is H, Formula Z represents an acrylate moiety, which includes acrylates (when both $R'_1$ and $R'_2$ are H) and derivatives thereof (when either $R'_1$ or $R'_2$ is not H). Similarly when one of ($R'_1$ and $R'_2$) is H and also $R'_3$ is $CH_3$, Formula 1' represents an methacrylate moiety, which includes methacrylates (when both $R'_1$ and $R'_2$ are H) and derivatives thereof (when either $R'_1$ or $R'_2$ is not H). Acrylate and/or methacrylate moieties of Formula Z are particularly useful comonomers to prepare the copolymers of the invention Conveniently moieties of Formula Z are those where n' is 1; $X'^1$ and $X'^2$ are both O; $R'_1$ and $R'_2$ are independently H, methyl or OH, and $R'_3$ is H or $CH_3$.

More conveniently moieties of Formula Z are those where n' is 1; $X'^1$ and $X'^2$ are both O; $R'_1$ is OH, $R'_2$ is $CH_3$, and $R'_3$ is H, and/or tautomer(s) thereof (for example of an acetoacetoxy functional species).

Most convenient unsaturated ester moieties are selected from: —OCO—CH=CH$_2$; —OCO—C(CH$_3$)=CH$_2$; acetoacetoxy, —OCOCH=C(CH$_3$)(OH) and all suitable tautomer(s) thereof.

It will be appreciated that any suitable moieties represented by Formula Z could be used in the context of this invention such as other reactive moieties.

Preferred vinyl monomers of those above are acrylate(s) and methacrylates. Non-silicon acrylate monomer(s) used to form copolymer defoaming agents of the invention may comprise one or more alkyl acrylates in which the alkyl radical has from 1 to 18 carbon atoms and which may be present in an amount of at least 50 weight % in the acrylate copolymer.

Optional additional monomers (other than said nonfluorinated alkyl acrylate) copolymerizable with such alkyl acrylate monomer can be present in the copolymer which included alkylated styrene, the higher alkyl (5 to 18 carbon atoms) methacrylates, higher alkyl maleates or fumarates and vinyl esters of the higher aliphatic monocarboxylic acids Examples of specific suitable activated unsaturated monomers that may be used as (co)monomers to prepare the polymeric additives of the present comprises any of the following:
    acrylic acid and esters thereof such as: methyl acrylate, ethyl acrylate, propyl acrylate, butyl acrylate, 2-ethylhexyl acrylate, lauryl acrylate, stearyl acrylate, behenyl acrylate, cyclohexyl acrylate and/or isobornyl acrylate;

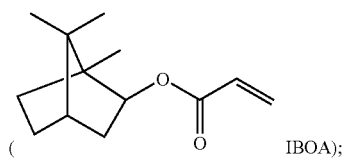
( IBOA);

methacrylic acid and esters thereof such: as methyl-methacrylate, ethyl methacrylate, propyl methacrylate, butyl methacrylate, 2-ethylhexyl methacrylate, decyl-methacrylate, lauryl methacrylate, stearyl methacrylate, behenyl methacrylate, cyclohexyl methacrylate and/or isobornyl methacrylate,
    hydroxyvinyl compounds such as hydroxyethyl acrylate, hydroxypropyl acrylate, hydroxyethyl methacrylate, hydroxypropyl methacrylate and/or hydroxyethylacrylate;
    aminovinyl compounds such as N-alkyl aminovinyl compounds for example N,N-dimethylaminoethyl acrylate, N,N-dimethylaminopropyl acrylate; N,N-dimethylaminoethyl methacrylate and/or N,N-dimethylaminopropyl methacrylate;
    vinyl aromatics such as styrene and/or α-methyl styrene;
    cyano compounds such as acrylonitrile, acrylamide and/or methacrylamide
    vinyl acids such a maleic acid, maleic anhydride, crylic acid and/or (optionally beta-) carboxyethyl acrylate (CEA)
    vinyl esters such as vinyl acetate, vinyl formal and vinyl butyral;
    crosslinking monomers such as glycidyl methacrylate, allyl methacrylate, epoxyl alkyl (meth)acrylate, diallyl maleate and butylene dicarylate; and mixtures thereof
    vinyl ethers such as ethyl vinyl ether, butyl vinyl ether and cyclohexyl vinyl ether;
    monomers containing perfluoroalkyl groups;
    macromonomers such as polyethyleneglycol acrylate,
    and/or suitable mixtures thereof (such as those mixtures of acrylic acids and esters available commercially from Arkema under the trademark Nosorcryl®)

Polymerisation

In a yet further aspect of the present invention broadly there is provided a method of making a polymer suitable for use as a defoamer comprising the step of:
    polymerising one or more mono silicone functional polymer precursors represented by Formula 1 herein, optionally in the presence of one or more other non silicon containing polymer precursors (such as any of those described herein).

The polymers of this invention can be made by any suitable method such as polymerization, condensation reactions or cross-linking reactions known to those skilled in the art. Suitable chemical processes comprise radical polymerization in solvent(s); emulsion(s) and/or dispersion(s) with any suitable curing method such as thermally and/or by actinic radiation (such as UV or electron beam) optionally in the present of photo-initiators. Optionally the acrylate silicone co-polymers of the invention may be prepared by bulk, emulsion or solution polymerization in the presence of a free-radical catalyst and further optionally with known polymerization regulators.

In a suitable bulk polymerisation to prepare polymers of the invention, a mixture of suitable polymer precursors and free radical catalyst may be agitated at a suitable temperature such as from about 35° C. to about 180° C. until polymerization is substantially complete.

In a suitable emulsion polymerization to prepare polymers of the invention, an emulsion of suitable polymer precursors in an aqueous solution with suitable emulsifying agents (such as soap or alkyl-substituted sulfosucinnate) may be polymerized at a suitable temperature for example from about 25° C. to about the boiling point of water.

In a suitable solution polymerization to prepare polymers of the invention, suitable polymer precursors may be dissolved in an inert liquid and the solution agitated in the presence of a catalyst at a suitable temperature such as from about 25° C. to about the boiling point of the solution. Suitable solvents are generally substantially neutral organic liquids, preferably aliphatic, aromatic alkyl aromatic and/or alicyclic hydrocarbons (for example hexane, benzene, ethylbenzene and/or cyclohexane); ketones (for example methyl ethyl ketone and/or acetone); esters (for example ethyl acetate and/or methyl propionate); chlorinated hydrocarbons (for example carbon tetrachloride and/or chloroform); ethers (for example ethyl ether and/or dioxane) and/or any suitable mixtures thereof.

Since the polymers of the invention may be added to oils (especially when used as a defoamer), it is preferred to form the polymer in a solvent which has no deterious effect on the desired oil so the resulting polymer solution can be directly added without the need to separating the polymer from the reaction media. However, if after completion of polymerization the polymer solution is too viscous for convenient handling, the solvent can be stripped away and the solid polymer re-dissolved in another solvent at a concentration (typically 30 to 60 wt. % polymer) that provides a less viscous, more readily handled solution tailored to oil to which the additive is to be added. Other reasons to change the polymerisation solvent might be to provide one which is more environmentally friendly, is safer (e.g. has a higher flash point) and/or is less odorous.

The polymers of the invention can be obtained by polymerising in the presence of polymerization modifiers regulating the solubility of the polymers. Such modifiers may comprises suitable chain transfer agents such as alkyl mercaptans, for example. tert-butyl mercaptan and/or n-dodecyl mercaptan; polyhaloalkanes for example carbon tetrachloride, chloroform and/or bromoform; nitroalkanes for example nitroethane and/or 2-nitropropane; liquid hydrocarbons for example toluene, ethylbenzene, and/or kerotene; and/or any suitable mixtures thereof. If used a chain transfer agent may be the solvent used during the reaction and/or it may be incorporated as an extraneous solvent for example dioxane, acetone, isopropanol, paraffin hydrocarbons and the like.

Suitable catalysts which may be used to prepare polymers of the invention are those known to those skilled in the art. Preferred catalysis comprise organic peroxide compounds such as acetyl, benzoyl, lauroyl or stearoylperoxide and tert-butyl or cumene hydroperoxide; inorganic per-compounds such as hydrogen peroxide, sodium perborate, or potassium persulfate, diazo compounds such as azo-bis-isobutyronitrile, alpha, alpha-azodiisobutyramide and/or suitable mixtures thereof.

Polymers of the invention may be obtained by batch polymerization for example where the reactants are agitated (charged initially at once or partially metered in over time during polymerization) at a suitable temperature from about 25° C. to about 200° C., preferably from about 80° C. to about 150° C. until the reaction is complete. Alternatively or as well the polymerisation may be continuously by constantly removing polymer while replenishing one or more of the polymer precursors, catalyst and/or regulating agent(s). When operating in batches the polymeric reaction product is usually separated from the reaction mixture by distilling off solvent and any unreacted starting material. However, as noted, separation may not be necessary when the reaction mixture as a solution of polymer in solvent is used directly as additive to the hydrocarbon oil.

Fluid Formulation (e.g. oil)

In still another aspect of the present invention broadly there is provided a composition resistant to defoaming comprising effective amount of one or more polymers of the invention as described herein.

The composition to which defoamers of the invention are added is usefully a fluid, more usefully a liquid for example a lubricant and/or oil. By way of non limiting illustration some examples of suitable fluids to which defoamers of the invention can be most usefully added are listed below but any other suitable fluid can be used as would be known to those skilled in the art.

The silicone in the (preferably) acrylate polymer antifoaming additives of the invention significantly improves resistance to foaming of hydrocarbon oils. Such silicone is provided by the presence of polymerized silicone acrylates as a monomer component of the acrylate polymer. The amount of such bound silicone in the acrylate copolymer will effect the degree of inhibition to foaming as will the formulation. Thus the amount of defoaming will varies with both the polymer of the invention and how it is dispersed in the hydrocarbon oil.

A positive amount (greater than zero) up to about 15% by weight silicon (Si) based on the total weight of the acrylate copolymer anti-foamer is generally adequate for most hydrocarbon oils. Preferably the amount of Si in the polymeric defoamer is from about 0.10% to about 5%, most preferably from about 0.20% to about 2% by weight.

Heavy oils and oils containing foam-inducing adjuvants require more of the polymer of the invention than do base oils with lesser foaming characteristics. Polymeric defoamers of the invention may be added to a hydrocarbon oil as a solution in an hydrocarbon solvent.

The foaming-inhibiting effect of the polymers of the invention is not materially affected by the presence of other adjuvants in fluid (e.g. hydrocarbon oil) to which they are added as the defoamers are present in the fluid in only very small quantities. For example the use in an oil of very acidic or very basic adjuvants has substantially no effect on performance of the antifoam additives of the present invention. Compositions of hydrocarbon oils containing defoamers of the invention are storage-stable over long time periods and also when subjected to heat and pressure during the operating conditions experience by the fluid during use.

Fluids rendered substantially foaming-resistant by incorporating a foam inhibiting quantity of the polymers of the present invention may comprise any of the following and/or suitable mixtures thereof; hydrocarbon oils such as synthetic or petroleum stocks of varying viscosities; lubricating oils for internal combustion engines and motors; diesel fuels; lubricants and pressure transfer media, industrial lubricants, process oils, hydraulic oils, turbine oils, spindle oils, journal bearing oils, pneumatic tool lubricants synthetic lubricant, metal working fluid, biodegradable oil, automotive engine oil, gear oil, automatic transmission fluid, industrial hydraulic and heavy duty crankcase oil, solvent borne liquid coatings, water-borne liquid coatings and/or any other suitable fluids. The fluids may be synthetic and/or natural hydrocarbons of any type such as paraffinic, naphthenic, aromatic and/or blends thereof. An preferred fluid of the present invention is a hydrocarbon oil suitable to lubricate moving parts at high temperatures (such as in engines and/or transmissions) which also comprises a polymeric defoamer of the present invention.

General

In general as used herein the terms 'effective', 'acceptable' 'active' and/or 'suitable' (for example with reference to any process, use, method, application, preparation, product, material, formulation, compound, monomer, oligomer, polymer precursor, and/or polymers of the present invention and/or described herein as appropriate) will be understood, unless the context indicates otherwise, to refer to those features of the invention which if used in the correct manner or added in the correct amount provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products. In the present invention the desired utility is suppression of foam and so effective features and amounts thereof are those which inhibit foam. In the compositions of the invention unless the context indicates otherwise "effective" etc means in an amount which is sufficient to inhibit foam.

In a further aspect of the invention there is provided use of the polymers and/or polymer precursors of the invention for the purpose of inhibiting foam in a composition.

In still a further aspect of the invention there is provided a method of inhibiting foam in a composition comprising the step of adding thereto one or more polymers and/or polymer precursors of the invention.

The defoamers of the present invention may be used alone and/or in combination with other known defoamers such as those described in U.S. Pat. No. 6,391,984 and/or U.S. Pat. No. 6,667,373.

Other aspects and embodiments of the invention are described in the claims and drawings herein and also in the priority application U.S. Ser. No. 60/840,440 filed on 28 Aug. 2006 the contents of which are hereby incorporated by reference.

EXAMPLES

The invention is further described in the following illustrative Examples which are not intended to limit the invention. Percentages are on a weight basis unless the context indicated otherwise.

Example 1

(Defoamer with 5% of divinyl-terminated polydimethylsiloxane):

This example illustrates the process for preparing a divinyl-terminated polydimethylsiloxane by radical polymerization in solvent.

A 2000 ml glass reactor equipped with an overhead agitator and two delay feeding pumps is initially charged with solvent ethyl acetate (60 g), Iso-propanol (40 g). The reactor is heated to 82° C. after which an initiator mixture (ethyl acetate (30 g), Iso-propanol (20 g), 2,2'-azobis(2-methylpropionitrile) (2.26 g)) and a monomer mixture (ethyl acrylate (161 g), 2-ethylhexyl acrylate (376 g) and divinyl-terminated polydimethylsiloxane (28 g)) are slowly added to the reactor over 5 hours. The reaction mixture is allowed to react for a further two hours at reflux temperature, cooled to 65° C. and then filtered through a 25 micrometer filter to collect a polymer of weight average molecular weight 88,500 Dalton, determined by GPC using polystyrene as standard.

Example 2

(Defoamer with 2% of divinyl-terminated polydimethylsiloxane):

A polymer is prepared similarly to Example 1 where the amount of reactive silicone is 2% by weight (compared to 5% for Example 1). The weight average molecular weight of the polymer obtained is 74,300 Dalton, determined by GPC.

Fluid Formulations

The defoamers prepared above as Examples 1 and 2 were added to various formulations and their defoaming performance tested. As a comparison a control of the same formulation without any defoamer was tested in each case (Control). In FIGS. 1 & 2 a further comparative formulation with conventional acrylate defoamer without silicone sold under the trade designation PC-1644 (Comp A) was tested. For FIGS. 3 & 4 the conventional non silicone acrylate defoamer added for comparison was that available under the trade name PC-2244 (Comp B).

Where added the defoamers were present in the formulations at a concentration of 100 ppm.

Data comparing the defoaming performance of samples similar to Examples 1 & 2 herein, and as a control and either Comp A or B are given in FIGS. 1, 2, 3 and 4 where.

FIG. 1 compares the test data for an automatic transmission fluid (ATF)

FIG. 2 compares defoaming in an aged gear oil

Figure 1:
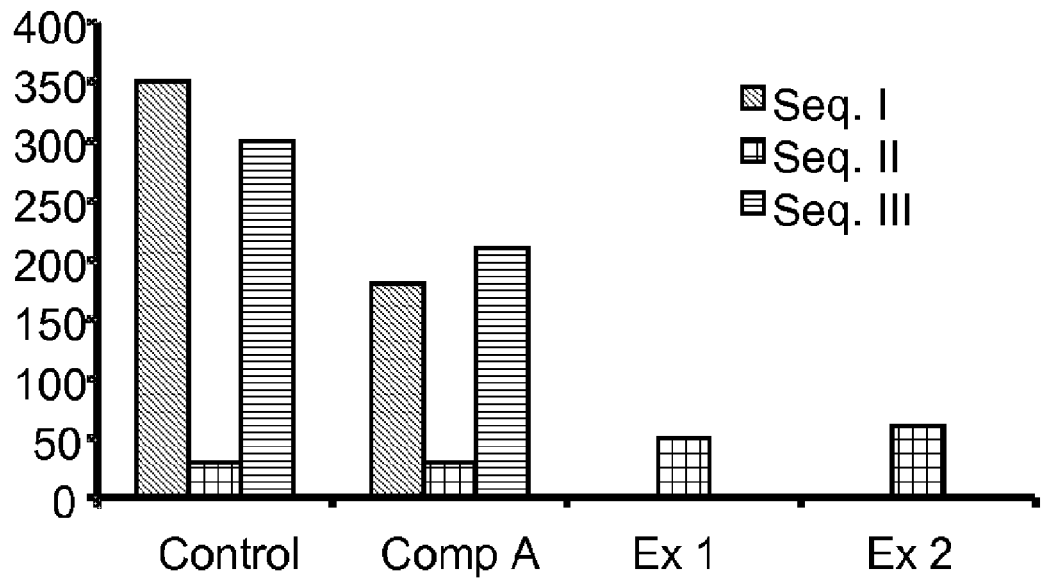
Figure 2:
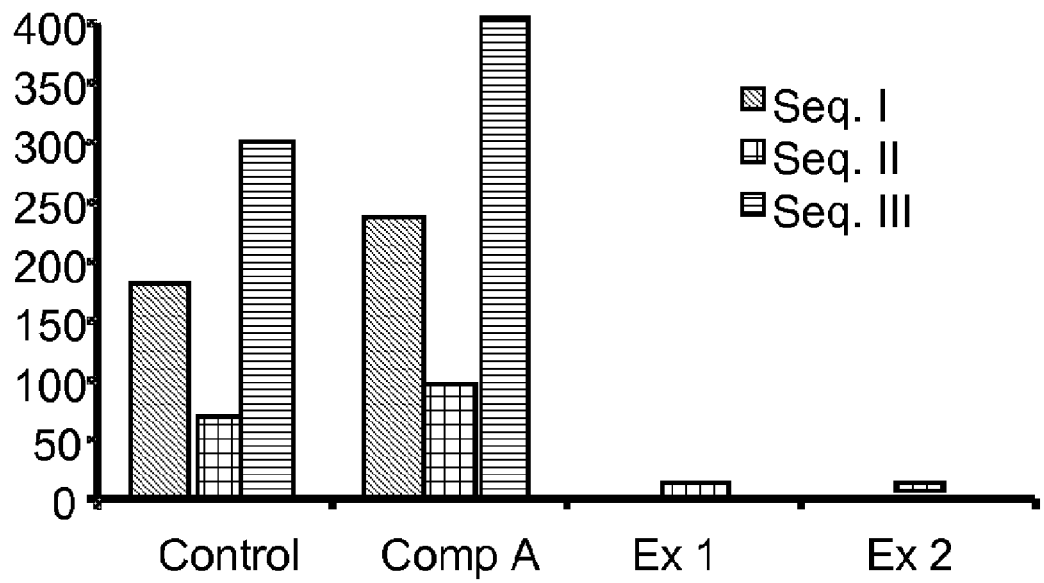
Figure 3:
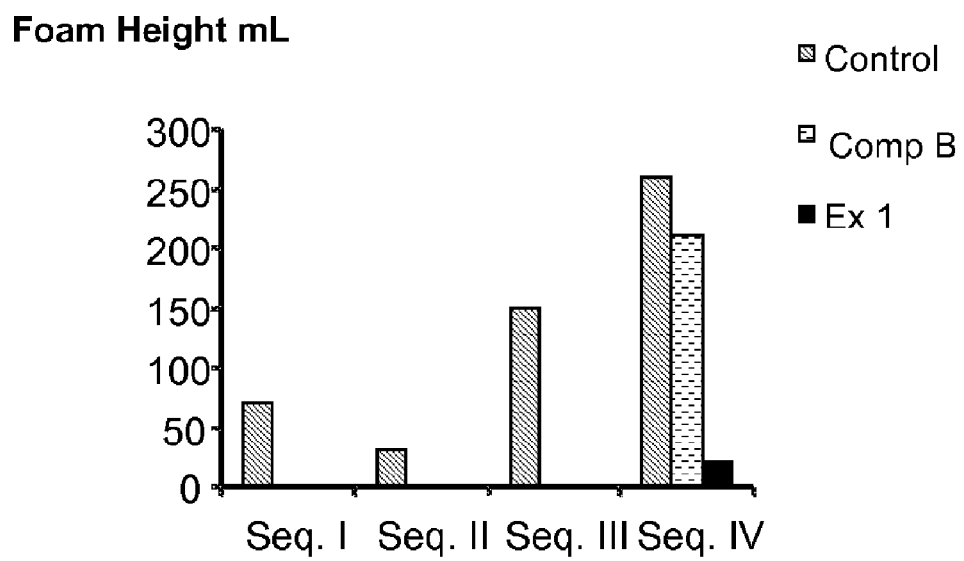
FIG. 3 shows high temperature defoaming performance in a synthetic gear oil under standard test sequence IV (at 150° C.)
Figure 4:
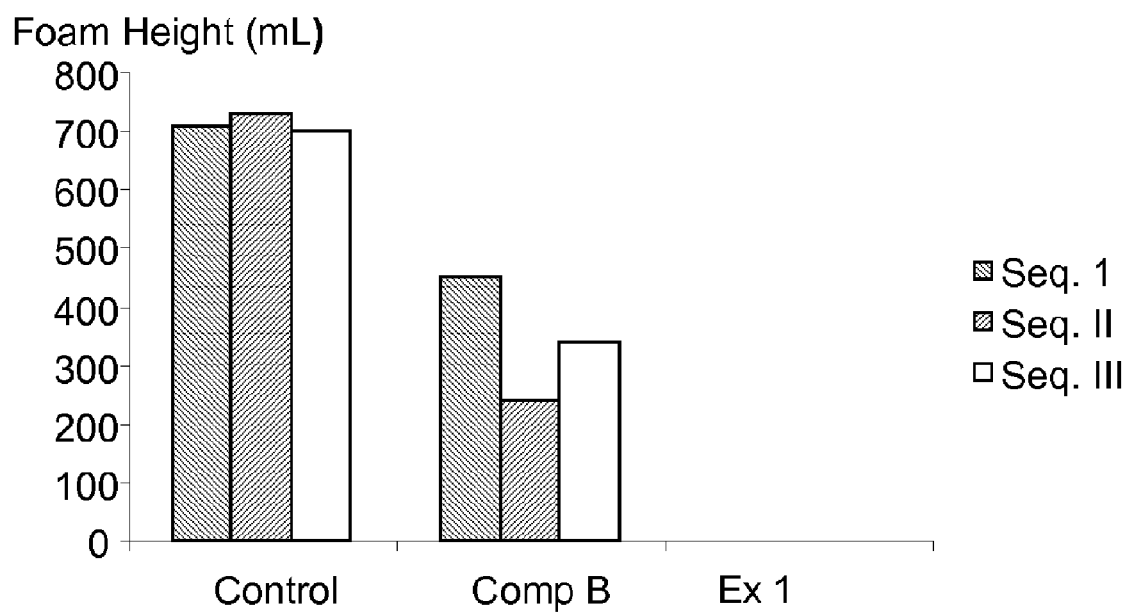
FIG. 4 shows defoaming performance in a synthetic oil

The different test methods used and identified herein and in the figures as Seq. 1 thru IV are known ASTM methods D 893 and D 6082.

Example 3

(Defoamer with 3% of 3-methacryloxypropyltris(trimethylsiloxy)silane):

This example illustrates the process for preparing a 3-methacryloxypropyltris(trimethylsiloxy)silane by radical polymerization in solvent.

A 2000 ml glass reactor equipped with an overhead agitator and two delay feeding pumps is initially charged with ethyl acetate (102.6 g) and isopropanol (25.7 g). The reactor is heated to reflux after which a mixture of azobisisobutylnitrile (5.17 g), ethyl acetate (60.3 g), isopaopanol (15.0 g), ethyl acrylate (235.07 g), 2-ethylhexyl acrylate (537.10 g), and 3-methacryloxypropyltris(trimethylsiloxy)silane (16.51 g) is gradually added to the reactor.

The reaction mixture is allowed to react for a further two hours and the solvent, residual monomers, and other by-products from initiation were removed by distillation. The resulting mixture is cooled to 65° C. and then filtered through a 25 micrometer filter to collect a colourless, viscous polymer of weight average molecular weight 69,200 Dalton, determined by GPC using polystyrene as standard. Analysis by GC/MS shows that almost all the reactive silane is been polymerized into polymer, as only 500 ppm of silane residue is left in the final product.

Flow/Leveling Agent

Example 4

(Flow Modifier with 5% of 3-methacryloxypropyltris(trimethylsiloxy)silane):

This example illustrates the process for preparing a 3-methacryloxypropyltris(trimethylsiloxy)silane by radical polymerization in solvent.

A 2000 ml glass reactor equipped with an overhead agitator and two delay feeding pumps is initially charged with solvent Isopar L (162.2 g) and then heated to 162° C. An initiator mixture (Lupersol 533 M75 (4.84 g) and Isopar L (31.94.9 g)) and a monomer mixture (ethyl acrylate (87.41 g), 2-ethylhexyl acrylate (495.32 g), 2-hydroxyethyl acrylate (53.58 g), and 3-methacryloxypropyltris(trimethylsiloxy)silane) (33.49 g)) are slowly added to the reactor over 5 hours. The reaction mixture is allowed to react for a further hour and the solvent, residual monomers, and other by-products from initiation were removed by distillation. The resulting mixture is cooled to 65° C. and then filtered through a 25 micrometer filter to collect a colourless, viscous polymer of weight average molecular weight 8,300 Dalton, determined by GPC using polystyrene as standard. Analysis by GC/MS shows that almost all the reactive silane is been polymerized into polymer, as only 500 ppm of silane residue is left in the final product.

Example 5

A polymer was prepared similarly to Example 4 where divinyl-terminated polydimethylsiloxane (compared to 3-methacryloxypropyltris(trimethylsiloxy)silane) for Example 4) was used. The weight average molecular weight is 9,390 Dalton, determined by GPC using polystyrene as standard.

Example 6

A polymer was prepared similarly to Example 5 where larger amount of initiator was used. The weight average molecular weight is 6,420 Dalton, determined by GPC using polystyrene as standard.

Liquid Coating Tests
Formula:

| | | | |
|---|---|---|---|
| Epicure 3115-X-70 | 16.7% | Resolution | Polyamide curing agent |
| Epon 1001-CX-75 | 27.9% | Resolution | Epoxy resin with —OH functionalities |
| Cymel U-216-8 | 1.7% | Cytec | Crosslinking agent |
| n-Butanol | 2.3% | | Solvent |
| Xylene | 22.1% | | Solvent |
| PM Acetate | 29.3% | | Solvent |
| Leveling agent | 0.035% | | Flow/leveling aid |

Flow modifiers were cut into 10% solution in Xylene. Application was carried out by automatic spraying equipment. After a flash time of 15 minutes, curing was conducted at 121° C. in 10 minutes. Film thickness was tested by Elcometer 256 from Elcometer. Micro-Tri-gloss from Byk Gardner gave the 20° C. and 60° C. gloss data. DOI and Peel were measured by Appearmax from Analytical Measurement Technology.

| Sample | DFTmils | 20° Gloss | 60° Gloss | DOI | Peel | Type of Si |
|---|---|---|---|---|---|---|
| Blank | 1.14 | 103.4 | 103.8 | 47.9 | 2.7 | — |
| Modaflow 2100 | 1.09 | 102.1 | 103.5 | 87.3 | 6.8 | — |
| Example 1 | 1.07 | 103.9 | 103.3 | 92.3 | 8.4 | Silane |
| Example 2 | 1.06 | 104.4 | 103.7 | 91.8 | 8.9 | Silane |
| Example 3 | 1.04 | 103.1 | 103.7 | 90.6 | 8.2 | Silane |
| Example 4 | 1.08 | 103.9 | 103.9 | 92.5 | 8.9 | Di-functional PDMS |

PSA

Polymers similar to those exemplified herein may be formulated into PSAs to have useful properties. An example formulation is given below

Example 7

Acrylic Copolymer Based Clearcoat

| Ingredient | Amount (weight %) | Source |
|---|---|---|
| Viacryl VSC 5754/60 SNABAC | 78.02% | Cytec Industries |
| Cymel 327/90% g | 17.14% | Cytec Industries |
| Methoxyproylacetate | 0.69% | |
| Butyl glycolacetate | 1.04% | |
| Butyl acetate | 3.11% | |

The invention claimed is:

1. A polymer precursor represented by Formula 1a

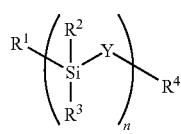

Formula 1a in which
Y represents a direct bond or an oxy group;
$R^1$ represents an optionally substituted organo group with at least one double bond wherein the double bond is optionally an activated unsaturated moiety such as a (meth) acrylate group;
$R^2$ and $R^3$ within each optional repeat unit, are independently chosen from one or more optionally substituted hydrocarbo, hydrocarbo(oxy), hydrosilico and/or hydrosilico(oxy) group(s);
$R^4$ is an optionally substituted organo group having at least one double bond as defined for $R^1$ above;
n is from about 0 to about 2000;
with the proviso that the polymer precursor(s) are other than those composed of a polysiloxane main chain and at least one block of polymerised unsaturated monomers obtained by reacting at least one polysiloxane containing pre-polymer containing at least one transferable group with ethylenically unsaturated monomers in a controlled free radical additional polymerisation.

2. A process for preparing a polymeric composition suitable for use as a pressure sensitive adhesive, flow modifier and/or defoaming agent from one or more reactive silicon containing polymer precursor(s) represented by Formula 1b:

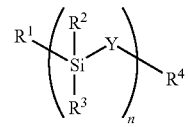

Formula 1b in which:
Y represents a direct bond or an oxy group;
$R^1$ represents an optionally substituted organo group with at least one double bond wherein the double bond is optionally an activated unsaturated moiety such as a (meth) acrylate group;
$R^2$ and $R^3$ within each optional repeat unit, are independently chosen from one or more of an optionally substituted hydrocarbo, hydrocarbo(oxy), hydrosilico and/or hydrosilico(oxy) group(s);
$R^4$ is an optionally substituted organo group having at least one double bond as defined for $R^1$ above;
n is from about 0 to about 2000.
the process comprising the step of: polymerising at least one polymer precursor of Formula 1b by a suitable means chosen from one or more of thermally, actinically, radically, and ionically induced polymerization.

3. The process of claim 2, in which the polymer precursor(s) of Formula 1b are polymerised together with at least one other silicon free co-polymer precursor(s).

4. A process for the preparation of a polymeric composition comprising subjecting at least one polymer precursor of Formula 1a as claimed in claim 1 to thermally, actinically, radically, or ionically induced polymerisation.

5. A polymeric composition comprising polymer molecules having moieties derived from at least one polymer precursor of claim 1.

6. A polymeric composition obtained by the process as claimed in claim 2.

7. A polymeric composition as claimed in claim 5, comprising polymer molecules having moieties derived from at least one polymer precursor of claim 1 and moieties derived from at least one vinyl type monomer which does not comprise silicon atoms or silicon groups.

8. The polymeric composition of claim 5, where the mass fraction of silicon in the polymeric composition is from 0.001% to 50%.

9. The polymeric composition of claim 5, wherein the weight-average molar mass of the polymeric composition is from 10 kg/mol to 250 kg/mol.

10. A polymeric flow modifier composition (flow modifier) comprising a polymer as claimed in claim 5.

11. A method for improving the flow properties of coating compositions, the method comprising adding a flow modifier according to claim 10 to a liquid or to a mixture of liquids to form a coating composition, and coating a suitable substrate such that the composition forms a coating having substantially even surface thereon.

12. A coating composition that forms an even surface when coated onto a substrate, comprising a flow modifying amount of a flow modifier as claimed in claim 10.

13. A polymeric anti-foaming agent composition (defoamer) comprising a polymer as claimed in claim 5.

14. A method for inhibiting foam in fluid compositions that have a tendency to foam, the method comprising adding a foam-inhibiting amount of a defoamer according to claim 13 to a liquid or to a mixture of liquids to form the fluid composition.

15. A composition resistant to foaming comprising a fluid having a tendency to foam and having dispersed therein a foam-inhibiting amount of a defoamer as claimed in claim 13.

16. A polymeric pressure sensitive adhesive composition (PSA) comprising the polymer as claimed in claim 5.

17. A PSA comprising an effective amount of a PSA composition as claimed in claim 16.

18. A method of using the PSA composition of claim 16 comprising adding the PSA to a liquid or a mixture of liquids to form a liquid mixture, and applying the liquid mixture to a surface of a substrate.

19. A substrate and/or laminate coated with the PSA composition of claim 16.

20. The process of claim 3, wherein the at least one silicon free co-polymer precursor is a (meth)acrylate monomer.

21. The process of claim 4, wherein the polymerization step is optionally performed in the presence of at least one vinyl type monomer that does not comprise silicon atoms or groups.

22. A polymeric flow modifier composition obtained by the process according to claim 3.

23. A polymeric anti-foaming agent composition obtained according to the process of claim 2.

24. A polymeric pressure sensitive adhesive composition obtained by the process according to claim 2.

25. A substrate according to claim 19, wherein the substrate is chosen from polymer film and paper.

\* \* \* \* \*